United States Patent Office 2,697,713
Patented Dec. 21, 1954

2,697,713

POLYHALOGENATED TETRA(2-BENZIMIDAZOLYL) ETHYLENES AND PROCESS

Robert G. Arnold, Salem, N. J., assignor to E. I. du Pont de Nemours and Company, Wilmington, Del., a corporation of Delaware No Drawing. Application June 11, 1952,
Serial No. 292,995

7 Claims. (Cl. 260—309.2)

This application is a continuation-in-part of my application Serial No. 278,971, filed March 27, 1952, and relates to novel organic compounds useful for the production of coloring matters.

According to my said copending application, novel coloring matters are produced by synthesizing organic compounds which possess a characteristic structure as expressed by the following formula

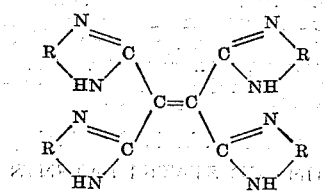

wherein the R's represent monocyclic aromatic radicals to which the respective N-atoms are attached in ortho positions. The novel coloring compounds have been there designated generically as tetrabenzimidazolyl ethylenes, wherein the benzo rings may be variously substituted by alkyl, alkoxy, halogen, nitro, amino and sulfo groups. According to the nature of such substituents, the novel coloring matters may be water-soluble and usable as dyestuffs, or they may be water-insoluble and useful as pigments. The instant application is concerned primarily with polyhalogen derivatives of said novel compounds and methods for making them. These polyhalogen derivatives form a natural subgroup of the above colors, by virtue of the attractive greenish yellow to orange hues of their dyeings upon textile fibers, and the excellent fastness properties of such dyeings.

The method of producing such halogen compounds consists essentially of subjecting to chlorination or bromination either the ethylene compounds aforementioned (that is, the pigment) or an intermediate which yields the pigment upon being treated with oxidizing agents. Two types of such intermediates have been disclosed in my parent case. One of these is a tetra-(2-benzimidazolyl)-ethane, which in turn has been obtained by reacting 1,1,2,2-tetracarbomethoxy ethane with ortho-phenylene diamine. The other type is di-(2-benzimidazolyl)-methane which is producible by reacting orthophenylene diamine with a lower dialkyl malonate, for instance diethyl malonate. When these intermediates are selected for the purpose of my present invention, conversion into dyestuff occurs in the halogenation treatment simultaneously with replacement of some of the nuclear hydrogen by halogen.

According to the conditions of the reaction, quantities of halogen anywhere from 1 to 16 atoms per molecule may be introduced, the higher halogenation products generally being obtained when more drastic conditions are employed, for instance more elevated temperature, larger proportions of halogenation agent, and longer reaction time. Inasmuch as the final reaction mass may contain molecules chlorinated to slightly different degrees, the final chlorine content is a mere statistical average, and is often expressible in fractional numbers. Likewise, in the case of the milder halogenation products, the average chlorine content may be less than 1 atom per mole.

Without limiting my invention, the following examples are given to illustrate my preferred mode of operation. Parts mentioned are by weight.

Example 1

Fifty parts of tetra(2-benzimidazolyl)-ethylene (Example 6 of Serial No. 278,971) were suspended in 975 parts of trichlorobenzene. Iodine (1 part) was added and the suspension was heated to 150°–155° C. Sulfuryl chloride (335 parts) was added dropwise over a 4 hour period at 155° C. The charge was held at 155° C. for ½ hour longer, cooled to room temperature and drowned in 1580 parts of ethyl alcohol (95%). The solid was filtered off and dried. The orange-brown solid was ground and extracted with benzene until no more impurities were removed. The remaining solid was of a bright yellow-orange color. Chlorine analysis indicated an average of 10.4 chlorine atoms.

Example 2

3 parts of partially nitrated tetrabenzimidazolyl-ethylene, as obtained in Example 10 of Serial No. 278,971, and 84 parts of freshly distilled sulfuryl chloride were mixed, charged into a nickel bomb and heated at 120° C. to 140° C. for 10 hours. The bomb was cooled, vented and its contents were drowned over ice. The solid product was filtered off and washed acid free. Analysis indicated that the product contained 15.5 atoms of chlorine per molecule. As a pigment, this polychloro derivative of 1,1,2,2-tetra (2-benzimidazolyl)-ethylene displays a bright greenish yellow shade, excellent bleed fastness characteristics and good fastness to light. Its sulfuric acid color is intense orange.

It will be noted that the initial material in this example contained from 1 to 1.5 nitro groups per molecule. But judging from the analysis of the final product, both as to Cl and as to N, the greater portion of these nitro groups were replaced by chlorine in the process.

Example 3

2.6 parts of tetra(2-benzimidazolyl)-ethylene were suspended in 42 parts of glacial acetic acid, and 12.4 parts of bromine were added. The mixture was heated at 100° C. under reflux for 30 minutes, thereafter poured into 300 parts of cold water and the solid was thoroughly washed with alcohol. A bright orange solid remained. It was found to correspond to a derivative containing an average of 6.25 bromine atoms.

Example 4

4 parts of tetra(2-benzimidazolyl)-ethylene were suspended in 150 parts of trichlorobenzene. A mixture of 5.8 parts of bromine in 10.5 parts of sulfuryl chloride was added. The mixture was heated to 80° C. with stirring and held at 80° C. for 1 hour. The temperature was then raised to 130° C. where it was maintained for 1 hour. The mixture was cooled and filtered and the orange solid was thoroughly washed with alcohol. The product contained 70.2% of bromine which corresponds to a content of approximately 14 bromine atoms per molecule.

It will be understood that the details of the above examples may be varied widely within the skill of those engaged in this art.

Thus, in lieu of the halogenating agents specifically named in the examples, others may be employed, for instance chlorine gas or sodium hypobromite.

Halogenation catalysts may be employed to speed up the reaction. Customary halogenation catalysts are iodine, ferric chloride, antimony trichloride and antimony pentachloride. The last three are particularly valuable when sulfuryl chloride is employed as halogenating agent.

In lieu of the solvents named in the examples, other inert solvents may be employed, for instance nitrobenzene. The choice of solvent generally depends on the temperature contemplated for the reaction, and the latter depends on the degree of halogenation sought. In general, temperatures in the range of 20° to 170° C. are recommended, the higher temperatures being selected where a high degree of halogenation is contemplated. In such event, it is natural to select a correspondingly high-boiling solvent; but lower-boiling solvents under pressure may also be resorted to.

The halogenated products of this invention are water-insoluble, and are therefore useful as pigments. In the lower halogenation stages, the shades of these pigments are not much different from those of the unhalogenated products, which are generally in the range of yellow to orange. At higher stages of halogenation a distinct shift toward the green is observed. Thus, when the chlorine content is more than 10 Cl atoms per molecule, the pigment becomes noticeably greener, while at a content of 15 Cl atoms per molecule the pigment is very much greener than the yellow parent material.

It has also been observed that the stability of the shade in the presence of acids and alkalis is continually improved with rising chlorine content. In the compound having 15 Cl atoms per molecule, sensitivity to acid has disappeared entirely as far as can be determined by practical tests.

When I speak hereinabove of halogen content, I am referring, of course, to halogen stably bound to the molecule. The reaction product may contain also certain quantities of loosely bound halogen (i. e. halogen not attached to a carbon atom). It is recommended that this loosely bound halogen be removed from the pigment prior to releasing the same for the market. This may be achieved in the recovery or finishing steps, for instance by acid-pasting from sulfuric acid. In some instances, mere washing with water will remove such halogen. Also, as illustrated in Example 1 above, the loose-halogen-complex compounds are soluble in benzene and may be removed by extractions with this solvent. In Example 4, on the other hand, there was no loose halogen.

I claim as my invention:

1. Organic compounds of the general formula

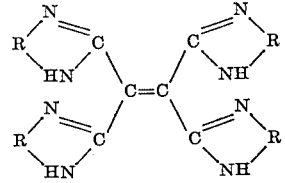

wherein the R's represent o-phenylene rings each of which carries not less than 1 and not more than 4 atoms of halogen selected from the group consisting of chlorine and bromine, the entire molecule containing not less than 6 atoms of halogen.

2. A polychloro tetra(2-benzimidazolyl)-ethylene containing not less than 10 Cl atoms per molecule.

3. A polybromo tetra(2-benzimidazolyl)-ethylene containing not less than 6 bromine atoms per molecule.

4. A polychloro tetra(2-benzimidazolyl)-ethylene containing on the average from 10 to 16 Cl atoms per molecule.

5. A polybromo tetra(2-benzimidazolyl)-ethylene containing on the average from 6 to 14 Br atoms per molecule.

6. The process of producing a halogenated tetra(2-benzimidazolyl)-ethylene which comprises halogenating tetra(2-benzimidazolyl)-ethylene at a temperature between 80° and 170° C. in an inert liquid medium selected from the group consisting of carbon tetrachloride, trichlorobenzene, nitrobenzene and acetic acid, the halogenating agent being selected from the group consisting of chlorinating agents and brominating agents, and the halogenation being continued until the compound has acquired at least 6 halogen atoms per molecule.

7. The process of producing a polychloro tetra(2-benzimidazolyl)-ethylene, which comprises reacting with sulfuryl chloride in the presence of iodine and at a temperature of 150° to 155° C. upon tetra(2-benzimidazolyl)-ethylene suspended in trichlorobenzene, the reaction being continued until not less than 10 Cl atoms per molecule have entered the product.

References Cited in the file of this patent

UNITED STATES PATENTS

| Number | Name | Date |
|---|---|---|
| 2,515,173 | Ackermann | July 18, 1950 |

OTHER REFERENCES

Wright: Chemical Reviews, vol. 48, No. 3, June 1951, pp. 408–11.